United States Patent [19]

Zachrei

[11] Patent Number: 5,211,499

[45] Date of Patent: May 18, 1993

[54] FASTENER FOR AFFIXING A MOUNTING TRACK TO A WALL OF A SWITCHBOX

[75] Inventor: Jurgen Zachrei, Dillenburg-Nanzenbach, Fed. Rep. of Germany

[73] Assignee: Rittal-Werk Rudolf Loh GmbH & Co. Kg, Fed. Rep. of Germany

[21] Appl. No.: 339,391

[22] Filed: Apr. 18, 1989

[30] Foreign Application Priority Data

Apr. 19, 1988 [DE] Fed. Rep. of Germany ....... 3812939

[51] Int. Cl.[5] .............................................. F16B 9/02
[52] U.S. Cl. ................................... 403/258; 403/255; 403/260; 403/407.1; 411/542; 211/41
[58] Field of Search ............... 403/406.1, 407.1, 405.1, 403/255, 258, 231, 192, 187, 230, 252, 256, 260, 264; 411/542, 371; 248/201, 297.3; 211/41

[56] References Cited

U.S. PATENT DOCUMENTS

| | | | |
|---|---|---|---|
| 3,816,011 | 6/1974 | Biebuyck et al. | 403/260 X |
| 4,013,372 | 3/1977 | Lay et al. | 403/258 X |
| 4,083,641 | 4/1978 | Sado | 403/258 X |
| 4,355,919 | 10/1982 | Lievonen | 403/255 X |
| 4,464,074 | 8/1984 | Green et al. | 403/192 |
| 4,601,621 | 7/1986 | Permoda | 403/258 X |
| 4,663,910 | 5/1987 | Hasan | 411/542 X |
| 4,741,582 | 5/1988 | Peroni | 403/407.1 X |
| 4,780,019 | 10/1988 | Johnson et al. | 403/239 X |
| 4,923,322 | 5/1990 | Burg | 403/255 X |

FOREIGN PATENT DOCUMENTS 7019745 5/1970 Fed. Rep. of Germany .

OTHER PUBLICATIONS

Schroff GmbH, "Schroff 19 Aufbausysteme für die Elektronik", Catalog 1987.
Schafer, "Das Programm '88", Catalog 1988.

Primary Examiner—Peter M. Cuomo
Attorney, Agent, or Firm—Jansson & Shupe

[57] ABSTRACT

A fastener for affixing a mounting track to a wall of a switchbox includes a retainer block for supporting a mounting track, the retainer block having a cross-sectional size and shape generally conforming to that of the interior cavity of the track. The retainer block includes a stop plate formed on a retainer block face, the stop plate covering the end of the mounting track when the retainer block is supporting the track. A fastening bore is formed in that end of the retainer block facing the stop plate and a sealing stay or rib is disposed on the retainer block to encircle the fastening bore.

9 Claims, 1 Drawing Sheet

FASTENER FOR AFFIXING A MOUNTING TRACK TO A WALL OF A SWITCHBOX

FIELD OF THE INVENTION

This invention is related generally to cabinet hardware mounting tracks and, more particularly, to a fastener for securing a mounting track to the side wall of a cabinet such as a switchbox cabinet.

BACKGROUND OF THE INVENTION

It is common to mount components, especially industrial components, upon building or cabinet walls using a mounting track which, in cross-sectional end view, generally defines a C-shape. Such mounting tracks are often fixed to the wall with the open face of the "C" facing outward and screws or bolts inserted through holes in the rear face of the track. When mounted in that manner, the open face of the "C" is toward the viewer, track attachment is straightforward and components may thereupon be mounted on the track by known means.

More recently, new configurations of industrial cabinets such as switchboxes have required that mounting tracks be installed on the side walls of the box rather than on the rear panel. When doing so, it is preferred that the track be mounted so that it might support significant weight and so that it might be attached to the cabinet at either end of a C-shaped section rather than by screws or bolts along the running length thereof. Mounting in this fashion would help provide extra rigidity and mechanical integrity to the cabinet and track assembly, especially if the mounting track could be supported between the rear wall of the cabinet and its front closing rim. A fastener which would permit quick and sturdy installation of a mounting track in this fashion would be an important advance in the art.

OBJECTS OF THE INVENTION

It is an object of this invention to overcome the shortcomings and disadvantages of the prior art.

Another object of the invention is to provide a fastener capable of supporting a mounting track between the rear wall and the closing rim of a cabinet.

Still another object of the invention is to provide a fastener for affixing a mounting track to a wall of a switchbox wherein a fastener retaining block is formed to generally conform with the cross-sectional interior shape of the track.

Still another object of the invention is to provide a fastener which includes additional fastening bores for the support of components.

Another object of the invention is to provide a fastener which includes a sealing stay for closure of the end of the mounting track and for limiting the travel of the fastener retainer block into the longitudinal channel of the track.

Still another object of the invention is to provide a fastener which may be readily produced as an injection molded plastic part.

How these and other objects are accomplished will become more apparent from the detailed description of the invention taken in conjunction with the drawings.

SUMMARY OF THE INVENTION

In general, the inventive fastener is constructed and arranged so that mounting tracks with their sides contacting the wall of the switchbox can be rapidly and simply affixed.

In keeping with the invention, a stop plate is formed on one of the faces of a retainer block, which is cross-sectionally matched to the cavity enclosed by the mounting track and can be inserted into said mounting track, while the stop plate covers the end of the mounting track so as to align flushly with its outer contour and at least the side of the retainer block facing the stop plate is provided with a fastening bore and a sealing stay encircling said fastening bore.

The fastener need merely be inserted into the cavity of the mounting track, while the retainer block secures the mounting track without play. The stop plate delimits the insertion movement of the fastener and the sealing stay encircling the fastening bore provides an annular seal for the bore in the wall of the switchbox as soon as the attachment screw has been utilized to tighten the stop plate and the sealing stay against the wall of the switchbox.

In one embodiment, the fastening bore in the fastener can be utilized for attachment screws on both sides, in that said fastening bore is designed as a connecting passage conically converging slightly toward the side of the retainer block without a stop plate. This conical taper makes for better removal from the mold when the fastener is produced as an injection-molded part.

The side of the fastener remote from the stop plate can then be utilized for the nonrotary attachment of other kinds of parts when the side of the retainer block remote from the stop plate is provided with additional fastening bores, which are preferably formed as blind bores. The stop plate and the sealing stay once again provide for sealing of the bore in the wall of the switchbox.

In a preferred embodiment With a cross-sectionally C-shaped mounting track with opposing sides, the retainer block has a strip-like land on one side, which fills the insertion slit between the opposing sides of the mounting track. The use of such mounting tracks has the advantage that additional slide matrices can be inserted into the mounting at any desired location, which can then be used for the attachment of further parts. The fasteners securing the mounting track to the wall of the switchbox can also be utilized for attaching additional parts when the land is provided with at least one fastening bore, preferably a blind bore.

For sealing the bore in the wall of the switchbox, which receives the attachment screw, the sealing stay can be designed to encircle the stop plate at a certain distance from its lateral edges or to encircle the fastening bore at a certain distance, while deformation of the sealing stay is easier in the latter case.

In a preferred embodiment, the fastener is designed and produced as an injection-molded plastic part.

DETAILED DESCRIPTIONS OF PREFERRED EMBODIMENTS

Figure 1:
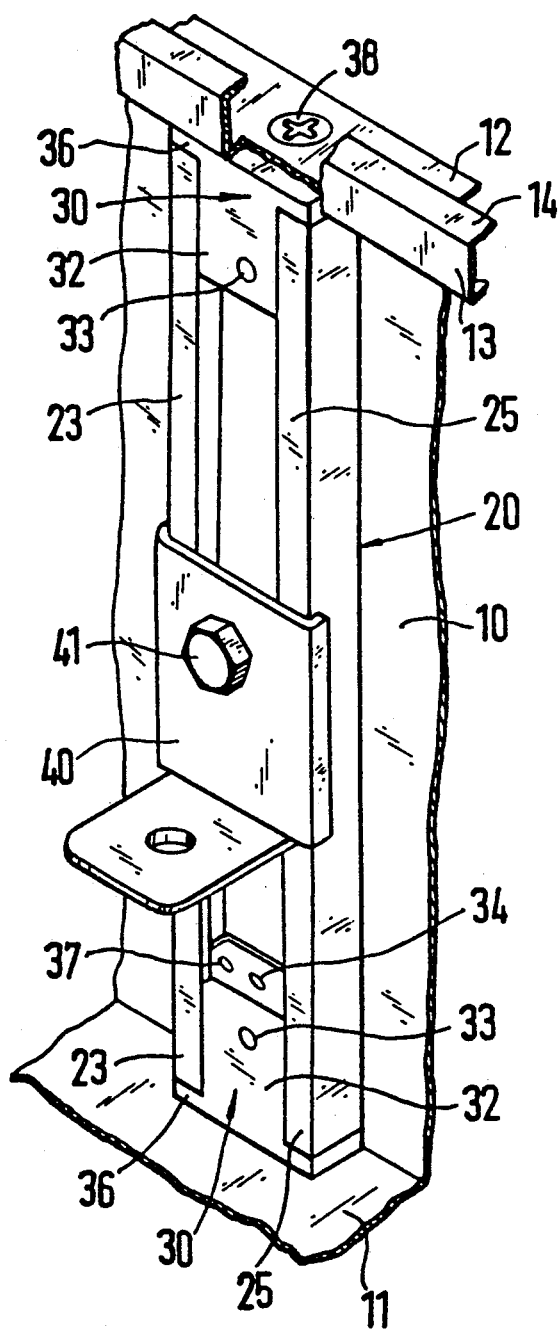
FIG. 1 is a side elevation perspective view of the fastener of the invention as used to support a mounting track between the rear wall and the closing rim of a cabinet shown with parts broken away.
Figure 2:
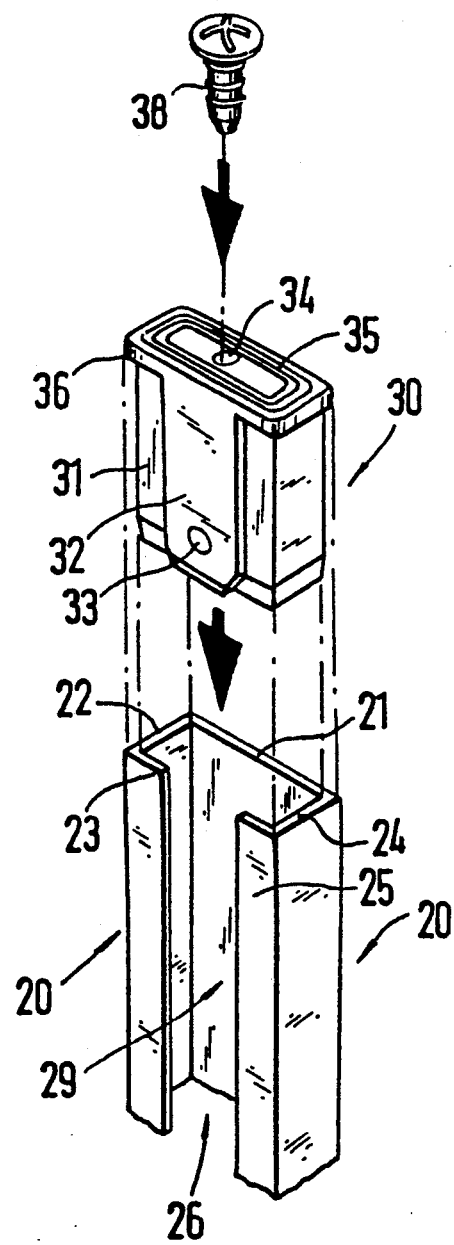
FIG. 2 is an exploded, side elevation perspective view of a fastener and a segment of mounting track to be supported thereby, with parts broken away.

Referring to FIGS. 1 and 2, the fastener 30 is shown in conjunction with part of a side wall 10 and part of a rear wall 11 of the box-like cabinet body. The open side of the body of the cabinet has a closing rim 12, which is bent at a right angle and undergoes transition into the upright closing strip 13 with an outward directed contact flange 14. In the area of the side wall 10, a C-shaped profile section is affixed as a mounting track 20. The opposing terminal sides 23, 25 of this track, which represent extensions of the side arms 22, 24, face each other at a given separation, so that a continuous insertion slit 29 opening toward the interior of the body of the cabinet is formed. The mounting track 20 thus takes the form of a partially hollow profile section with a cavity 26. Into each end of the mounting track 20 fasteners 30 are inserted. The fasteners 30 include retainer blocks 31, which are cross-sectionally matched to the configuration of the cavity 26 of the mounting track 20. The ends of the fasteners 30 adjoining the rear wall 11 and the closing rim 12, respectively, of the body of the cabinet are closed with stop plates 36, which cover the ends of the mounting track 20 and align flushly with their outer contour.

As best shown in FIG. 2, the fastening bore 34, which can be either a blind bore or a connecting passage, is provided in the side of the fastener 30 adjoining the stop plate 36. The fastening bore 34 has a longitudinal axis which is generally parallel to the length of the mounting track. When this bore 34 is designed as a connecting passage 34, it conically converges slightly away from the stop plate 36. An annular sealing rib 35, which follows the edges of the stop plate 36 at a certain distance or merely encircles the fastening bores 34, is situated on the stop plate 36 so as to encircle the fastening bore 34 completely.

Once a fastener 30 has been inserted into an end of the mounting track 20, the stop plate 36 delimits the insertion movement. The terminal sides 23, 25, the side arms 22, 24, and the base leg 21 of the mounting track 20 surround the retainer block 31 of the fastener 30 without play, while the strip-like land 32 flushly fills the insertion slit 29 of the mounting track 20. The fastening screws 38 are passed through bores in the closing rim 12 and the rear wall 11 and tightened into the fastening bores 34 in the fasteners 30. In this manner, the stop plates 36 are drawn and secured to the closing rim 12 and the rear wall 11, so that the sealing stays or ribs 35 on the stop plates 36 undergo deformation to effect a good seal of the bores in the closing rim 12 and the rear wall 11 vis-a-vis the interior of the body of the cabinet.

The insertion slit 29 permits the incorporation and securing of additional slide matrices at any desired point, so that other fastening parts, e.g., the angled fastener 40, can be tightened onto the mounting track 20 by means of screws, as illustrated by the screw 41.

The side of the fastener 30 away from the stop plate 36 can also be provided with additional fastening bores 37, so that, when the fastener 30 is used without the mounting track 20, this face of the fastener 30 can be utilized for the nonrotary attachment of other components.

While the principles of this invention have been described in connection with specific embodiments, it should be understood clearly that these descriptions are made only by way of example and are not intended to limit the scope of the invention.

I claim:

1. Fastener means for supporting a cross-sectionally C-shaped mounting track between a front rim and a rear wall of a switchbox, such mounting track having a front end, a rear end and an interior cavity with a longitudinal axis, the fastener means including:
    a retainer block for supporting said mounting track, said retainer block having a cross-sectional size and shape generally conforming to that of the interior cavity of said mounting track whereby the block is confined within said interior cavity;
    said retainer block including a generally planar and transverse stop plate having an outer edge portion formed on a retainer block end face and oriented to be generally parallel to the rear wall of the switch box, said outer edge portion of said stop plate abutting the front end of said mounting track when said retainer block is supporting said mounting track;
    a fastening bore with a longitudinal axis generally parallel to the length of the mounting track, the bore being formed in said end face of said retainer block adjacent to said stop plate; and,
    an annular sealing rib disposed on said end face of the retainer block along said outer edge portion of said stop plate.

2. The fastener according to claim 1, wherein said fastening bore is formed as a connecting passage which conically converges slightly toward a second side of said retainer block opposite that side used for mounting said stop plate.

3. The fastener according to claim 2, wherein said second side of said retainer block has at least one additional fastening bore which is preferably formed as a blind bore.

4. The fastener according to claim 3 wherein the mounting track has opposing sides defining an insertion slit therebetween and wherein said retainer block includes a strip-like land disposed on one side thereof, said land having a width generally equal to that of the insertion slit.

5. The fastener according to claim 4 wherein said fastener is an injection-molded plastic part.

6. The fastener according to claim 5 wherein said land includes at least one fastening bore.

7. The fastener according to claim 5 wherein said sealing rib is configured to engage a closing rim of a cabinet when said fasteners are installed therein for supporting said mounting track.

8. The fastener according to claim 1 wherein the mounting track has opposing sides defining an insertion slit therebetween and wherein said retainer block has a strip-like land on one side, which is substantially equal to the width of the insertion slit between the opposing sides of said mounting track and which is received in said insertion slit when said retainer block is inserted into said mounting track.

9. An apparatus for mounting components within a box having a side wall, a rear wall and a front rim, the rear wall and the rim being spaced apart from one another, the apparatus including:
    a generally C-shaped mounting track having a longitudinal interior cavity therewithin and a pair of opposed terminal sides, a longitudinal slit being defined by such sides;
    a rear retainer block received in the cavity for supporting one end of the track and including a first generally planar and transverse stop plate having an outer edge portion formed on a rear retainer block end face, said rear retainer block having a first fastening bore formed in said end face adjacent to said first stop plate for attaching said rear block to the rear wall;

a first annular sealing rib disposed on said end face of said rear retainer block along said outer edge portion of said first stop plate to extend around said first fastening bore;

a front retainer block received in the cavity for supporting another end of the track and including a second generally planar and transverse stop plate having an outer edge portion formed on a front retainer block end face, said front retainer block having a second fastening bore formed in said front retainer block end face adjacent to said second stop plate for attaching said front block to the rim;

the mounting track being supported adjacent to the side wall of the box when the rear retainer block is attached to the rear wall and the front retainer block is attached to the rim, the apparatus thereby providing support for brackets attached to the mounting track by at least one fastener inserted through the slit.

* * * * *